(12) United States Patent
Zou et al.

(10) Patent No.: US 11,639,852 B2
(45) Date of Patent: May 2, 2023

(54) THREE-AXIS MICROELECTROMECHANICAL SYSTEM (MEMS) GYROSCOPE

(71) Applicant: Senodia Technologies (Shaoxing) Co., Ltd., Shaoxing (CN)

(72) Inventors: Bo Zou, Shanghai (CN); Qinglong Zheng, Shanghai (CN); Shuang Liu, Shanghai (CN)

(73) Assignee: SENODIA TECHNOLOGIES (SHAOXING) CO., LTD., Shaoxing (CN)

( * ) Notice: Subject to any disclaimer, the term of this patent is extended or adjusted under 35 U.S.C. 154(b) by 0 days.

(21) Appl. No.: 17/781,724

(22) PCT Filed: Apr. 2, 2020

(86) PCT No.: PCT/CN2020/082892
§ 371 (c)(1),
(2) Date: Jun. 2, 2022

(87) PCT Pub. No.: WO2021/109378
PCT Pub. Date: Jun. 10, 2021

(65) Prior Publication Data
US 2023/0010336 A1    Jan. 12, 2023

(30) Foreign Application Priority Data
Dec. 6, 2019 (CN) .......................... 201911240938.X

(51) Int. Cl.
*G01C 19/5712*    (2012.01)
(52) U.S. Cl.
CPC ............................... *G01C 19/5712* (2013.01)
(58) Field of Classification Search
CPC .................................................. G01C 19/5712
See application file for complete search history.

(56) References Cited

U.S. PATENT DOCUMENTS

| 8,113,050 B2 | 2/2012 | Acar et al. |
| 8,322,213 B2 * | 12/2012 | Trusov ............... G01C 19/5747 73/504.12 |

(Continued)

FOREIGN PATENT DOCUMENTS

| CN | 1948906 A | 4/2007 |
| CN | 102221361 A | 10/2011 |

(Continued)

OTHER PUBLICATIONS

Yin Yong, et al., Structural scheme design and simulation of structure-decoupled dual-mass MEMS gyroscope, Journal of Southeast University (Natural Science Edition), 2008, pp. 918-922, vol. 38, No. 5.

(Continued)

*Primary Examiner* — David J Bolduc
(74) *Attorney, Agent, or Firm* — Bayramoglu Law Offices LLC

(57) ABSTRACT

A three-axis microelectromechanical system (MEMS) gyroscope includes four proof masses, where the proof masses are connected by spring beams and/or rigid beams; a first proof mass is configured to move in an X-axis direction; a second proof mass is configured to rotate around an X-direction axis, a Y-direction axis, and a Z-direction axis, and when the first proof mass moves in the X-axis direction, the second proof mass is driven to rotate around the Z-direction axis; a third proof mass is configured to move in the X-axis direction and a Y-axis direction, and when the first proof mass moves in the X-axis direction, the third proof mass is driven to move in the Y-axis direction; a fourth proof mass is configured to move in the X-axis direction, and when the third proof mass moves in the X-axis direction, the fourth proof mass is driven to move in the X-axis direction.

6 Claims, 5 Drawing Sheets

(56) References Cited

U.S. PATENT DOCUMENTS

| | | | | |
|---|---|---|---|---|
| 8,534,127 | B2* | 9/2013 | Seeger | G01C 19/5712 |
| | | | | 73/514.32 |
| 8,960,002 | B2* | 2/2015 | Nasiri | G01P 15/0888 |
| | | | | 73/514.32 |
| 10,697,994 | B2* | 6/2020 | Acar | G01P 15/18 |
| 11,193,771 | B1* | 12/2021 | Gregory | G01C 19/574 |
| 2006/0107738 | A1 | 5/2006 | Willig et al. | |
| 2011/0094302 | A1 | 4/2011 | Shih | |
| 2013/0192365 | A1 | 8/2013 | Zhuang et al. | |
| 2015/0114112 | A1 | 4/2015 | Valzasina et al. | |
| 2017/0284804 | A1* | 10/2017 | Gattere | G01C 19/5747 |
| 2020/0049505 | A1* | 2/2020 | Gattere | G01C 19/5747 |
| 2020/0064134 | A1* | 2/2020 | Gattere | G01C 19/5712 |

FOREIGN PATENT DOCUMENTS

| | | |
|---|---|---|
| CN | 102798386 A | 11/2012 |
| CN | 203837718 U | 9/2014 |
| CN | 104897147 A | 9/2015 |
| CN | 105531564 A | 4/2016 |
| CN | 106066175 A | 11/2016 |
| CN | 107192384 A | 9/2017 |
| CN | 107270883 A | 10/2017 |
| CN | 107782296 A | 3/2018 |
| CN | 107782297 A | 3/2018 |
| CN | 107782298 A | 3/2018 |
| CN | 108507555 A | 9/2018 |
| CN | 109737943 A | 5/2019 |
| CN | 110307833 A | 10/2019 |
| CN | 110319822 A | 10/2019 |
| CN | 110926445 A | 3/2020 |
| EP | 1568968 A2 | 8/2005 |
| EP | 2339293 A1 | 6/2011 |
| TW | 201908694 A | 3/2019 |
| WO | 2019019942 A1 | 1/2019 |

OTHER PUBLICATIONS

G.Q. Wu, et al., A dual-mass fully decoupled MEMS gyroscope with wide bandwidth and high linearity, Sensors and Actuators A: Physical, 2017, pp. 50-56, vol. 259.

* cited by examiner

THREE-AXIS MICROELECTROMECHANICAL SYSTEM (MEMS) GYROSCOPE

CROSS REFERENCE TO THE RELATED APPLICATIONS

This application is the national phase entry of International Application No. PCT/CN2020/082892, filed on Apr. 2, 2020, which is based upon and claims priority to Chinese Patent Application No. 201911240938.X, filed on Dec. 6, 2019, the entire contents of which are incorporated herein by reference.

TECHNICAL FIELD

The present disclosure relates to the field of microelectromechanical systems (MEMS), in particular to a three-axis MEMS gyroscope.

BACKGROUND

With the trend that all consumer electronics are increasingly portable and light, smaller gyroscope chips are urgently needed in the market. Capacitive resonance gyroscopes are mostly adopted as MEMS gyroscopes in this market. With regard to the capacitive resonance gyroscopes, capacitive mechanical structures are driven to make proof masses vibrate in a driving mode, and the capacitance change caused by the movement of the proof masses in a detection direction in the presence of the Coriolis force is detected by means of detection capacitor.

Mechanical parts of the traditional three-axis gyroscopes are composed of an X-axis gyroscope, a Y-axis gyroscope, and a Z-axis gyroscope which are each independent from one another. Each single-axis gyroscope structurally includes a proof mass, a driving structure, and a detection structure which are each independent from one another. Moreover, three independent driving circuits are configured in the corresponding application-specific integrated circuit (ASIC) for respective driving, resulting in large volumes of three-axis gyroscope chips.

The existing three-axis gyroscopes mainly adopt one set of driving parts shared by three axes, that is, the detection parts of the three axes are driven by one set of driving parts. Therefore, the total area of the MEMS gyroscopes and the cost of the gyroscope chips are reduced, and the requirements on the power consumption of the circuits are lowered.

The existing three-axis gyroscopes have the following problems: the driving parts cannot be completely decoupled from the detection parts; as a result, the driving parts or the detection parts affect other movement modes during the movement; and the detection proof masses include an X-axis detection proof mass, a Y-axis detection proof mass, and a Z-axis detection proof mass, resulting in a low area utilization rate of the detection proof masses.

SUMMARY

In order to solve the problems in the prior art, the present disclosure provides a three-axis MEMS gyroscope which includes:

a first proof mass configured to move in an X-axis direction;

a second proof mass configured to rotate around an X-direction axis, a Y-direction axis, and a Z-direction axis, where when the first proof mass moves in the X-axis direction, the second proof mass is driven to rotate around the Z-direction axis;

a third proof mass configured to move in the X-axis direction and a Y-axis direction, where when the first proof mass moves in the X-axis direction, the third proof mass is driven to move in the Y-axis direction; and a fourth proof mass configured to move in the X-axis direction, where when the third proof mass moves in the X-axis direction, the fourth proof mass is driven to move in the X-axis direction, where the proof masses are connected by spring beams and/or rigid beams.

Further, the three-axis MEMS gyroscope further includes a first rigid beam, where the first rigid beam is respectively connected to the first proof mass and the third proof mass through a spring beam; and when the first proof mass moves in the X-axis direction, the first rigid beam is driven to move, and the third proof mass is driven by the first rigid beam to move in the Y-axis direction.

Further, the first rigid beam includes a plurality of sub-beams, where a joint of the first rigid beam and the first proof mass is set to connect two of the sub-beams to the first proof mass through one spring beam; a joint of the first rigid beam and the third proof mass is set to connect two of the sub-beams to the third proof mass through one spring beam; and the sub-beams are sequentially connected end to end.

Further, the three-axis MEMS gyroscope further includes a second rigid beam, where the second rigid beam is respectively connected to the second proof mass and the first rigid beam through a spring beam; and when the first proof mass moves in the X-axis direction, the first rigid beam is driven to rotate around the Z-direction axis, the second rigid beam is driven by the first rigid beam to rotate around the Z-direction axis, and the second proof mass is driven by the second rigid beam to rotate around the Z-direction axis.

Further, the second rigid beam is further connected to a fixed anchor through a spring beam, and the second rigid beam is restricted from moving in the X-axis direction and the Y-axis direction.

Further, the three-axis MEMS gyroscope further includes a third rigid beam, where the third rigid beam is respectively connected to the second proof mass and the fixed anchor through a spring beam; and the X-direction axis and the Y-direction axis are defined by the spring beam connected to the third rigid beam, so that the second proof mass is fit to rotate around the X-direction axis and the Y-direction axis.

Further, the third proof mass is connected to the fourth proof mass through a spring beam; and when the third proof mass moves in the X-axis direction, the fourth proof mass is driven to move in the X-axis direction.

Further, the fourth proof mass is further connected to a fixed anchor through a spring beam, and the fourth proof mass is configured to move in the X-axis direction, and restricted from moving in the Y-axis direction.

Further, the three-axis MEMS gyroscope further includes a first fixed electrode and a second fixed electrode, where the first fixed electrode and the second fixed electrode coordinate with the second proof mass to form corresponding detection capacitors, which are respectively configured to perform detection when the second proof mass rotates around the X-direction axis and around the Y-direction axis.

Further, the three-axis MEMS gyroscope further includes a third fixed electrode, where the third fixed electrode coordinates with the fourth proof mass to form a detection capacitor.

The three-axis MEMS gyroscope of the present disclosure has the following advantages:

1. decoupling of all structures is fulfilled by combination of the rigid beams and the spring beams, and is classified as the decoupling between a driving part and a Z-axis detection part and the decoupling between an X-axis/Y-axis detection part and the Z-axis detection part;

2. coupling of a symmetrical structure of the Z-axis detection part is fulfilled; the driving part can move in an X-axis detection direction and a Y-axis detection direction; not only that, but two parts, located on two sides of the overall structure, of the Z-axis detection part can be coupled, so that movement consistency of a Z-axis differential detection part is achieved, and errors and interference which are caused by inconsistent movement are reduced; and 3. an X-axis detection proof mass and a Y-axis detection proof mass are combined to reduce the waste of the proof masses in area, so that the overall sensitivity is improved.

In order to make the objectives, features and effects of the present disclosure fully understood, the concepts, specific structures and technical effects of the present disclosure are clearly and completely described below in conjunction with the examples and drawings.

DETAILED DESCRIPTION OF THE EMBODIMENTS

Figure 1:
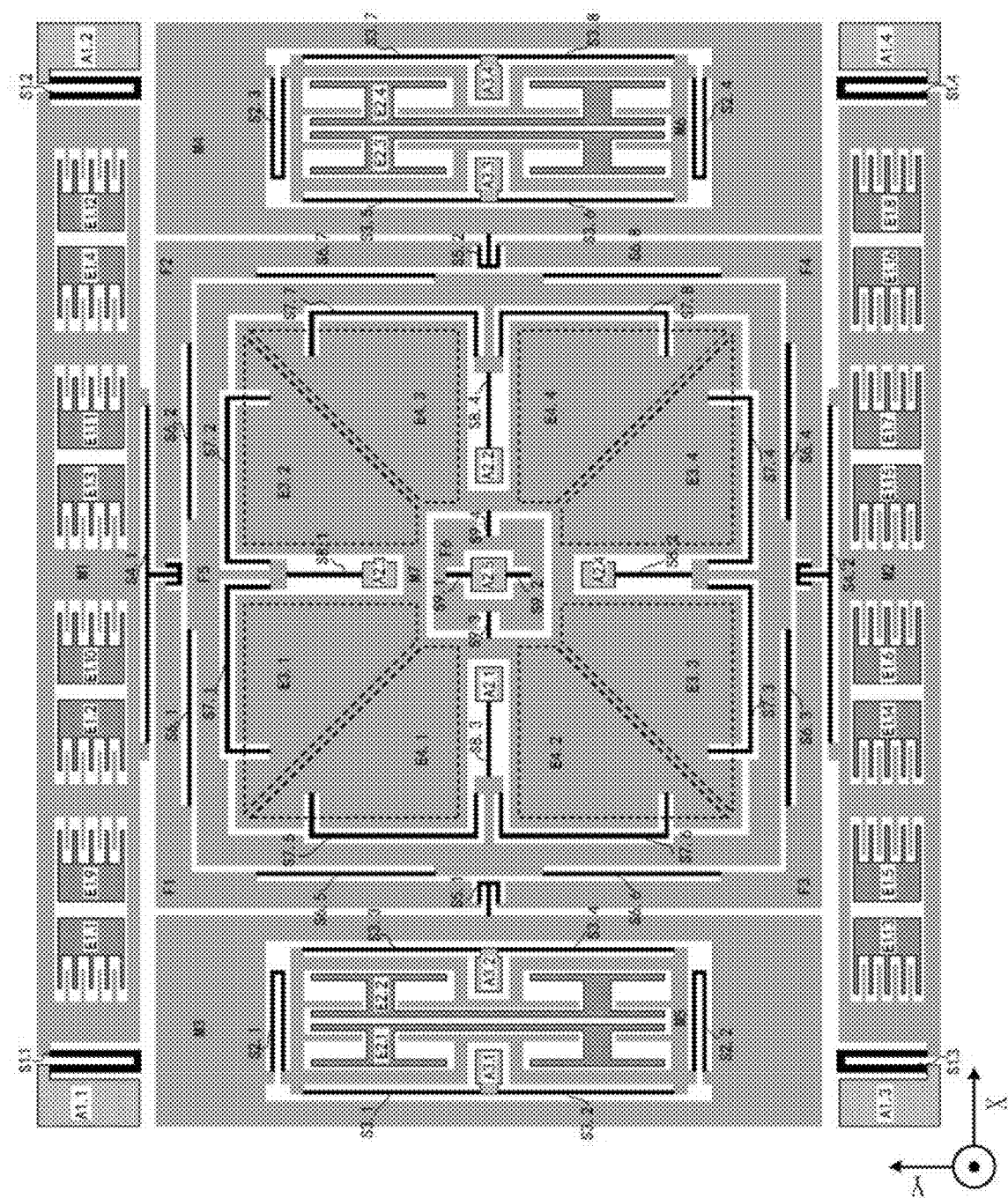
FIG. 1 is a structural diagram of a preferred embodiment of the present disclosure.

It should be understood that, in the description of the embodiments of the present disclosure, the terms such as "upper", "lower", "front", "back", "left", "right", "vertical", "horizontal", "top", "bottom", "inner", "outer", "clockwise", and "anticlockwise" are intended to indicate orientations or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the utility model. In the drawings, namely schematic diagrams or conceptual diagrams, the relationship between the thickness and width of each part, the proportional relationship among the parts, and the like are not completely consistent with their actual values.

FIG. 1 shows a structural diagram of a three-axis MEMS gyroscope in a preferred embodiment of the present disclosure. The three-axis MEMS gyroscope is overall symmetrical along an X axis and a Y axis (directions of the X axis, the Y axis, and a Z axis are shown in FIG. 1, and an origin of coordinates is located at a center of the three-axis MEMS gyroscope in this embodiment). The three-axis MEMS gyroscope includes fixed anchors A1.1-A1.4, fixed anchors A2.1-A2.5, fixed anchor A3.1-A3.4, spring beams S1.1-S1.4, spring beams S2.1-S2.4, spring beams S3.1-S3.8, spring beams S4.1-S4.2, spring beams S5.1-S5.2, spring beams S6.1-S6.8, spring beams S7.1-S7.8, spring beams S8.1-S8.4, spring beams S9.1-S9.4, rigid beams F1-F6, proof masses M1-M7, fixed electrodes E1.1-E1.16, fixed electrodes E2.1-E2.4, fixed electrodes E3.1-E3.4, and fixed electrodes E4.1-E4.4, where the fixed electrodes E3.1-E3.4 and the fixed electrodes E4.1-E4.4 are arranged at a bottom of the proof mass M7 at intervals (in a direction extending from a plane shown in FIG. 1 to a back side of FIG. 1), and thus are expressed by dotted lines.

The fixed anchors A1.1-A1.4, the fixed anchors A2.1-A2.5, the fixed anchors A3.1-A3.4, the spring beams S1.1-S1.4, the spring beams S2.1-S2.4, the spring beams S3.1-S3.8, the spring beams S4.1-S4.2, the spring beams S5.1-S5.2, the spring beams S6.1-S6.8, the spring beams S7.1-S7.8, the spring beams S8.1-S8.4, the spring beams S9.1-S9.4, the rigid beams F1-F6, and the proof masses M1-M7 are connected to one another to form a movable component PM of the gyroscope.

The proof mass M1 and the proof mass M2 have the same structure and are symmetrical with respect to the X axis; the proof mass M1 is connected to the fixed anchor A1.1 through the spring beam S1.1 and connected to the fixed anchor A1.2 through the spring beam S1.2; comb structures are coordinately arranged between the fixed electrodes E1.1-E1.4 and the proof mass M1 to form capacitors $C_{E1.1}$-$C_{E1.4}$, and comb structures are coordinately arranged between the fixed electrodes E1.9-E1.12 and the proof mass M1 to form capacitors $C_{E1.9}$-$C_{E1.12}$.

The proof mass M2 is connected to the fixed anchor A1.3 through the spring beam S1.3 and connected to the fixed anchor A1.4 through the spring beam S1.4; comb structures are coordinately arranged between the fixed electrodes E1.5-E1.8 and the proof mass M2 to form capacitors $C_{E1.5}$-$C_{E1.8}$, and comb structures are coordinately arranged between the fixed electrodes E1.13-E1.16 and the proof mass M1 to form capacitors $C_{E1.13}$-$C_{E1.16}$.

In this embodiment, the spring beams S1.1-S1.4 have the same structure in a U shape open towards a direction parallel to the Y axis; the spring beam S1.1 and the spring beam S1.3 as well as the spring beam S1.2 and the spring beam S1.4 are symmetrical with respect to the X axis; and the spring beam S1.1 and the spring beam S1.2 as well as the spring beam S1.3 and the spring beam S1.4 are symmetrical with respect to the Y axis. The fixed anchor A1.1 and the fixed anchor A1.3 as well as the fixed anchor A1.2 and the fixed anchor A1.4 are symmetrical with respect to the X axis, and the fixed anchor A1.1 and the fixed anchor A1.2 as well as the fixed anchor A1.3 and the fixed anchor A1.4 are symmetrical with respect to the Y axis.

The rigid beams F1-F4 have the same structure in an L shape. The rigid beam F1 and the rigid beam F3 as well as the rigid beam F2 and the rigid beam F4 are symmetrical with respect to the X axis, and the rigid beam F1 and the rigid beam F2 as well as the rigid beam F3 and the rigid beam F4 are symmetrical with respect to the Y axis. The rigid beam F1 is connected to the rigid beam F2 through the spring beam S4.1; the rigid beam F2 is connected to the rigid beam F4 through the spring beam S5.2; the rigid beam F3 is connected to the rigid beam F4 through the spring beam S4.2; and the rigid beam F3 is connected to the rigid beam F1 through the spring beam S5.1. In this embodiment, the spring beam S4.1 and the spring beam S4.2 have the same structure formed by combination of a T shape and an E shape, and are symmetrical with respect to the X axis; the spring beam S4.1 is connected to the proof mass M1; and the spring beam S4.2 is connected to the proof mass M2.

In this embodiment, the spring beam S5.1 and the spring beam S5.2 have the same structure in an E shape and are symmetrical with respect to the Y axis; the spring beam S5.1 is connected to the proof mass M3; and the spring beam S5.2 is connected to the proof mass M4. The proof mass M3 and the proof mass M4 have the same structure symmetrical along the X axis, and are symmetrical with respect to the Y axis and arranged on two sides of a space defined by the rigid beams F1-F4.

The rigid beam F5 of a hollow quadrilateral structure approximately is arranged in the space defined by the rigid beams F1-F4, and is overall symmetrical along the X axis and the Y axis; and the rigid beam F5 is connected to the rigid beam F1 through the spring beam S6.1 and the spring beam S6.5, connected to the rigid beam F2 through the spring beam S6.2 and the spring beam S6.7, connected to the rigid beam F3 through the spring beam S6.3 and the spring beam S6.6, and connected to the rigid beam F4 through the spring beam S6.4 and the spring beam S6.8. In this embodiment, the spring beams S6.1-S6.8 are all straight; the spring beams S6.1-S6.4 are parallel to the X axis, and the spring beams S6.5-S6.8 are parallel to the Y axis; and the spring beams S6.1 and the spring beam S6.3 as well as the spring beam S6.2 and the spring beam S6.4, the spring beam S6.5 and the spring beam S6.6, and the spring beam S6.7 and the spring beam S6.8 are symmetrical with respect to the X axis; and the spring beam S6.1 and the spring beam S6.2 as well as the spring beam S6.3 and the spring beam S6.4, the spring beam S6.5 and the spring beam S6.7, and the spring beam S6.6 and the spring beam S6.8 are symmetrical with respect to the Y axis.

The rigid beam F5 is connected to the fixed anchor A2.3, the fixed anchor A2.4, the fixed anchor A2.1, and the fixed anchor A2.2 sequentially through the spring beam S8.1, the spring beam S8.2, the spring beam S8.3, and the spring beam S8.4; and the fixed anchor A2.1 and the fixed anchor A2.2 are symmetrical with respect to the Y axis and located on the X axis, and the fixed anchor A2.3 and the fixed anchor A2.4 are symmetrical with respect to the X axis and located on the Y axis. In this embodiment, the spring beams S8.1-S8.4 are all straight; the spring beam S8.1 and the spring beam S8.2 are symmetrical with respect to the X axis and located on the Y axis; and the spring beam S8.3 and the spring beam S8.4 are symmetrical with respect to the Y axis and located on the X axis.

The proof mass M7 is arranged in the rigid beam F5 and is overall symmetrical along the X axis and the Y axis; a periphery of the proof mass M7 is connected to the rigid beam F5 through the spring beams S7.1-S7.8; and the spring beam S7.1 and the spring beam S7.2 are arranged close to the proof mass M1, the spring beam S7.3 and the spring beam S7.4 are arranged close to the proof mass M2, the spring beam S7.5 and the spring beam S7.6 are arranged close to the proof mass M3, and the spring beam S7.7 and the spring beam S7.8 are arranged close to the proof mass M4. In this embodiment, the spring beams S7.1-S7.8 have the same structure in a U shape; U-shaped structures of the spring beam S7.1 and the spring beam S7.2 are open towards a negative direction of the Y axis; U-shaped structures of the spring beam S7.3 and the spring beam S7.4 are open towards a positive direction of the Y axis; U-shaped structures of the spring beam S7.5 and the spring beam S7.6 are open towards a positive direction of the X axis; U-shaped structures of the spring beam S7.7 and the spring beam S7.8 are open towards a negative direction of the X axis; the spring beam S7.1 and the spring beam S7.3 as well as the spring beam S7.2 and the spring beam S7.4, the spring beam S7.5 and the spring beam S7.6, and the spring beam S7.7 and the spring beam S7.8 are symmetrical with respect to the X axis; and the spring beam S7.1 and the spring beam S7.2 as well as the spring beam S7.3 and the spring beam S7.4, the spring beam S7.5 and the spring beam S7.7, and the spring beam S7.6 and the spring beam S7.8 are symmetrical with respect to the Y axis.

The fixed electrodes E3.1-E3.4 and the fixed electrodes E4.1-E4.4 (expressed by the dotted lines) have the same structure and are arranged at the bottom of the proof mass M7 at intervals; the fixed electrode E3.1 and the fixed electrode E3.3 as well as the fixed electrode E3.2 and the fixed electrode E3.4, the fixed electrode E4.1 and the fixed electrode E4.2, and the fixed electrode E4.3 and the fixed electrode E4.4 are symmetrical with respect to the X axis; and the fixed electrode E3.1 and the fixed electrode E3.2 as well as the fixed electrode E3.3 and the fixed electrode E3.4, the fixed electrode E4.1 and the fixed electrode E4.3, and the fixed electrode E4.2 and the fixed electrode E4.4 are symmetrical with respect to the Y axis. Capacitors $C_{E3.1}$-$C_{E3.4}$ are formed by the fixed electrodes E3.1-E3.4 and the proof mass M7, and capacitors $C_{E4.1}$-$C_{E4.4}$ are formed by the fixed electrodes E4.1-E4.4 and the proof mass M7.

The rigid beam F6 is arranged in the proof mass M7 and is overall symmetrical along the X axis and the Y axis; and the rigid beam F6 is connected to the fixed anchor A2.5 through the spring beam S9.1 and the spring beam S9.2, and connected to the proof mass M7 through the spring beam S9.3 and the spring beam S9.4.

The fixed anchor A2.5 is arranged in the rigid beam F6, and is overall symmetrical along the X axis and the Y axis; the fixed anchor A2.5 is located at the center of the three-axis MEMS gyroscope in this embodiment; and a central point of the fixed anchor A2.5 is just the origin of an X-Y-Z coordinate system in this embodiment.

In this embodiment, the spring beams S9.1-S9.4 are all straight; the spring beam S9.1 and the spring beam S9.2 are symmetrical with respect to the X axis and located on the Y axis; and the spring beam S9.3 and the spring beam S9.4 are symmetrical with respect to the Y axis and located on the X axis.

The proof mass M5 in the proof mass M3 and the proof mass M6 in the proof mass M4 have the same structure symmetrical along the X axis, and are symmetrical with respect to the Y axis; the proof mass M5 is connected to the proof mass M3 through the spring beam S2.1 and the spring beam S2.2; and the proof mass M6 is connected to the proof mass M4 through the spring beam S2.3 and the spring beam S2.4. In this embodiment, the spring beams S2.1-S2.4 have the same structure in a U shape open towards a direction parallel to the X axis; the spring beam S2.1 and the spring beam S2.2 as well as the spring beam S2.3 and the spring beam S2.4 are symmetrical with respect to the X axis; and the spring beam S2.1 and the spring beam S2.3 as well as the spring beam S2.2 and the spring beam S2.4 are symmetrical with respect to the Y axis.

The proof mass M5 is connected to the fixed anchor A3.1 through the spring beam S3.1 and the spring beam S3.2, and connected to the fixed anchor A3.2 through the spring beam S3.3 and the spring beam S3.4. The proof mass M6 is connected to the fixed anchor A3.3 through the spring beam S3.5 and the spring beam S3.6, and connected to the fixed anchor A3.4 through the spring beam S3.7 and the spring beam S3.8. The fixed anchors A3.1-A3.4 are located on the X axis, and the fixed anchor A3.1 and the fixed anchor A3.4 as well as the fixed anchor A3.2 and the fixed anchor A3.3 are symmetrical with respect to the Y axis. In this embodiment, the spring beams S3.1-S3.8 are all straight and parallel to the Y axis; the spring beam S3.1 and the spring beam S3.2 as well as the spring beam S3.3 and the spring beam S3.4, the spring beam S3.5 and the spring beam S3.6, and the spring beam S3.7 and the spring beam S3.8 are symmetrical with respect to the X axis; and the spring beam S3.1 and the spring beam S3.7 as well as the spring beam S3.3 and the spring beam S3.5, the spring beam S3.2 and the spring beam S3.8, and the spring beam S3.4 and the spring beam S3.6 are symmetrical with respect to the Y axis.

Comb structures are coordinately arranged between the fixed electrode E2.1 and the proof mass M5 and between the fixed electrode E2.2 and the proof mass M5 respectively to form a capacitor $C_{E2.1}$ and a capacitor $C_{E2.2}$. Comb structures are coordinately arranged between the fixed electrode E2.3 and the proof mass M6 and between the fixed electrode E2.4 and the proof mass M6 respectively to form a capacitor $C_{E2.3}$ and a capacitor $C_{E2.4}$.

Potentials of the three-axis MEMS gyroscope in this embodiment are formed as follows:

The proof mass M1 and the driving proof mass M2 are set as driving proof masses. The capacitor $C_{E1.1}$ and the capacitor $C_{E1.4}$ which correspond to the driving proof mass M1 and the capacitor $C_{E1.5}$ and the capacitor $C_{E1.8}$ which correspond to the driving proof mass M2 constitute a driving capacitor C_DR1; the capacitor $C_{E1.9}$ and the capacitor $C_{E1.12}$ which correspond to the driving proof mass M1 and the capacitor $C_{E1.13}$ and the capacitor $C_{E1.16}$ which correspond to the driving proof mass M2 constitute a driving capacitor C_DR2; the capacitor $C_{E1.2}$ and the capacitor $C_{E1.3}$ which correspond to the driving proof mass M1 and the capacitor $C_{E1.6}$ and the capacitor $C_{E1.7}$ which correspond to the driving proof mass M2 constitute a driving detection capacitor C_DS1; and the capacitor $C_{E1.10}$ and the capacitor $C_{E1.11}$ which correspond to the driving proof mass M1 and the capacitor $C_{E1.14}$ and the capacitor $C_{E1.15}$ which correspond to the driving proof mass M2 constitute a driving detection capacitor C_DS2.

The proof mass M7 is set as an X-axis detection proof mass. The capacitor $C_{E4.1}$ corresponding to the fixed electrode E4.1 and the capacitor $C_{E4.2}$ corresponding to the fixed electrode E4.2 constitute an X-axis detection capacitor C_X1, and the capacitor $C_{E4.3}$ corresponding to the fixed electrode E4.3 and the capacitor $C_{E4.4}$ corresponding to the fixed electrode E4.4 constitute an X-axis detection capacitor C_X2.

The proof mass M7 is also set as a Y-axis detection proof mass. The capacitor $C_{E3.1}$ corresponding to the fixed electrode E3.1 and the capacitor $C_{E3.2}$ corresponding to the fixed electrode E3.2 constitute a Y-axis detection capacitor C_Y1, and the capacitor $C_{E3.3}$ corresponding to the fixed electrode E3.3 and the capacitor $C_{E3.4}$ corresponding to the fixed electrode E3.4 constitute a Y-axis detection capacitor C_Y2.

The proof mass M5 and the proof mass M6 are set as Z-axis detection proof masses. The capacitor $C_{E2.1}$ corresponding to the fixed electrode E2.1 and the capacitor $C_{E2.4}$ corresponding to the fixed electrode E2.4 constitute a Z-axis detection capacitor C_Z1, and the capacitor $C_{E2.2}$ corresponding to the fixed electrode E2.2 and the capacitor $C_{E2.3}$ corresponding to the fixed electrode E2.3 constitute a Z-axis detection capacitor C_Z2.

Figure 2:
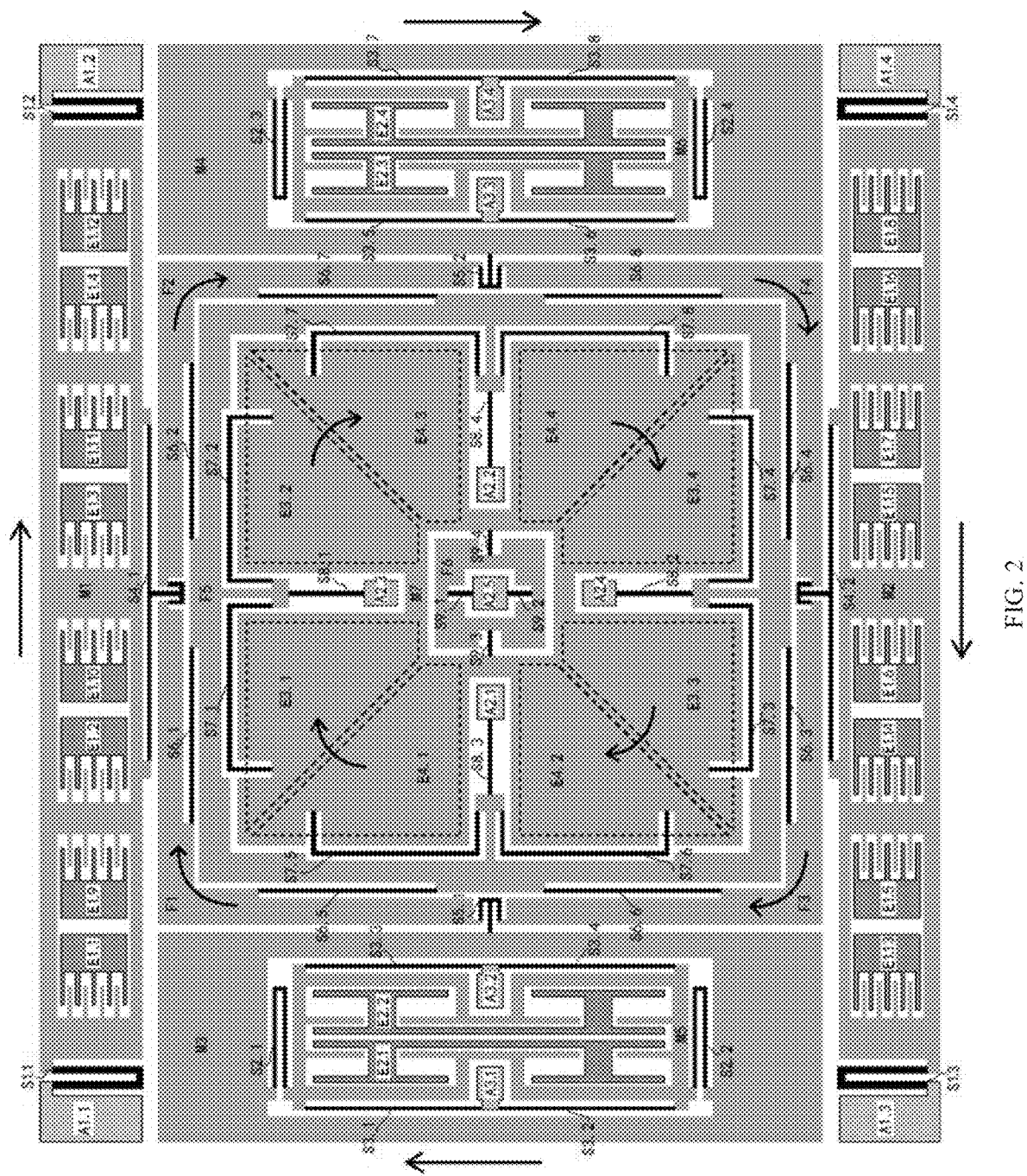
FIG. 2 is a schematic diagram illustrating a driving mode of the three-axis MEMS gyroscope in FIG. 1.

In terms of functions, the three-axis MEMS gyroscope in this embodiment is designed to have a driving part, an X-axis detection part, a Y-axis detection part and a Z-axis detection part. The details are as follows:

FIG. 2 shows a schematic diagram illustrating a driving mode of the three-axis MEMS gyroscope in this embodiment. When alternating voltages in opposite directions are applied to both ends of the driving capacitor C_DR1 and both ends of the driving capacitor C_DR2, alternating electrostatic forces are generated, so that the proof mass M1 and the proof mass M2 reciprocate in an X-axis direction. The proof mass M1 is connected to the rigid beam F1 and the rigid beam F2 through the spring beam S4.1, and the proof mass M2 is connected to the rigid beam F3 and the rigid beam F4 through the spring beam S4.2, so that the rigid beams F1-F4 are driven to move; and the rigid beams F1-F4 are connected to the rigid beam F5 through the spring beams S6.1-S6.8, so that the rigid beam F5 is driven to move during movement of the rigid beams F1-F4. The rigid beam F5 is connected to the fixed anchor A2.3, the fixed anchor A2.4, the fixed anchor A2.1, and the fixed anchor A2.2 sequentially through the spring beam S8.1, the spring beam S8.2, the spring beam S8.3, and the spring beam S8.4, such that a movement direction of the rigid beam F5 is limited. Therefore, the rigid beams F1-F4 and the rigid beam F5 can move only with the structural center as a center of a circle, that is, the rigid beams F1-F4 and the rigid beam F5 clockwise or counterclockwise rotate around the fixed anchor A2.5. The rigid beam F5 is connected to the X-axis/Y-axis detection proof mass M7 through the spring beams S7.1-S7.8, so that the X-axis/Y-axis detection proof mass M7 is driven to clockwise or counterclockwise rotate around the structural center when the driving proof mass M1 and the driving proof mass M2 reciprocate in the X-axis direction.

The rigid beam F1 and the rigid beam F3 are connected to the Z-axis Coriolis force proof mass M3 through the spring beam S5.1, and the rigid beam F2 and the rigid beam F4 are connected to the Z-axis Coriolis force proof mass M4 through the spring beam S5.2, so that the Z-axis Coriolis force proof mass M3 and the Z-axis Coriolis force proof mass M4 are driven to move when the rigid beams F1-F4 clockwise or counterclockwise rotate around the fixed anchor A2.5. The Z-axis Coriolis force proof mass M3 is connected to the Z-axis detection proof mass M5 through the spring beam S2.1 and the spring beam S2.2, the Z-axis Coriolis force proof mass M4 is connected to the Z-axis detection proof mass M6 through the spring beam S2.3 and the spring beam S2.4, and the spring beams S2.1-S2.4 in the U shape have high rigidity in the X-axis direction and low rigidity in the Y-axis direction, such that the Z-axis Coriolis force proof mass M3 and the Z-axis Coriolis force proof mass M4 can move only in the Y-axis direction. In addition, the Z-axis Coriolis force proof mass M3 can be decoupled from the Z-axis detection proof mass M5 through the spring beam S2.1 and the spring beam S2.2, and the Z-axis Coriolis force proof mass M4 can be decoupled from the Z-axis detection proof mass M6 through the spring beam S2.3 and the spring beam S2.4; and in a case of decoupling, the Z-axis detection proof mass M5 and the Z-axis detection proof mass M6 are not driven to move during movement of the Z-axis Coriolis force proof mass M3 and the Z-axis Coriolis force proof mass M4.

Preferably, in order to accurately control a driving amplitude, the driving detection capacitor C_DS1 and the driving detection capacitor C_DS2 are structurally adopted to calibrate the driving amplitude.

Figure 3:
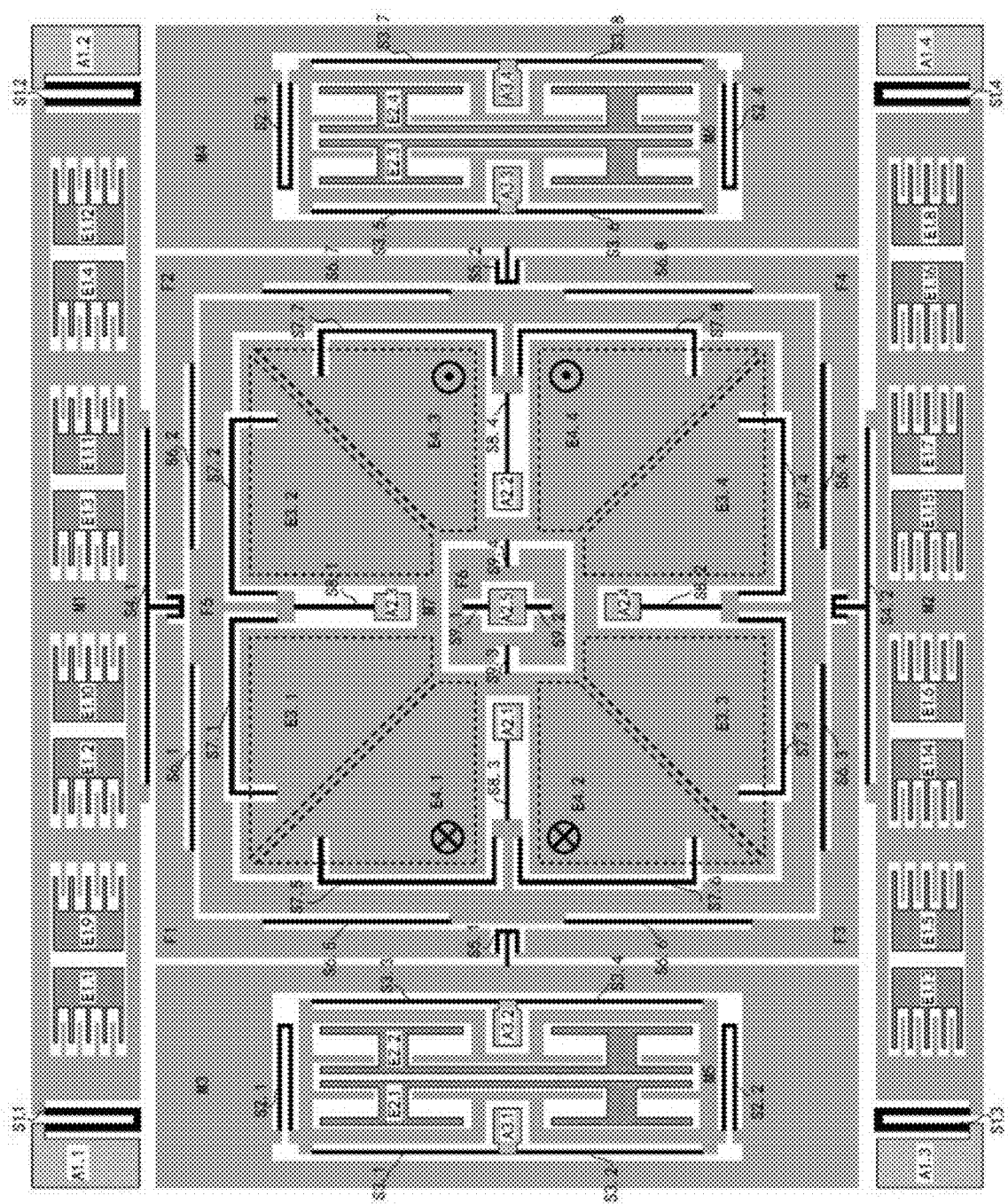
FIG. 3 is a schematic diagram illustrating X-axis detection of the three-axis MEMS gyroscope in FIG. 1.

FIG. 3 shows a schematic diagram illustrating X-axis detection of the three-axis MEMS gyroscope in this embodiment. When an angular velocity is input around the X axis, the X-axis/Y-axis detection proof mass M7 clockwise or counterclockwise rotating around the structural center is subjected to a Coriolis force around the X axis. In this case, the X-axis/Y-axis detection proof mass M7 is forced to rotationally reciprocate around a Y-direction axis, namely a horizontal line defined by the spring beam S8.1, the spring beam S8.2, the spring beam S9.1, and the spring beam S9.2, and outside a plane defined by the X axis and the Y axis; and under the circumstance, the distance from the X-axis/Y-axis detection proof mass M7 to the fixed electrode E4.1 and the fixed electrode E4.2 and the distance from the X-axis/Y-axis detection proof mass M7 to the fixed electrode E4.3 and the fixed electrode E4.4 are changed oppositely, so that the capacitor C_X1 and the capacitor C_X2 are changed in a manner that one is increased and the other is decreased. The angular velocity input around the X axis can be calculated by means of a subsequent difference channel.

Figure 4:
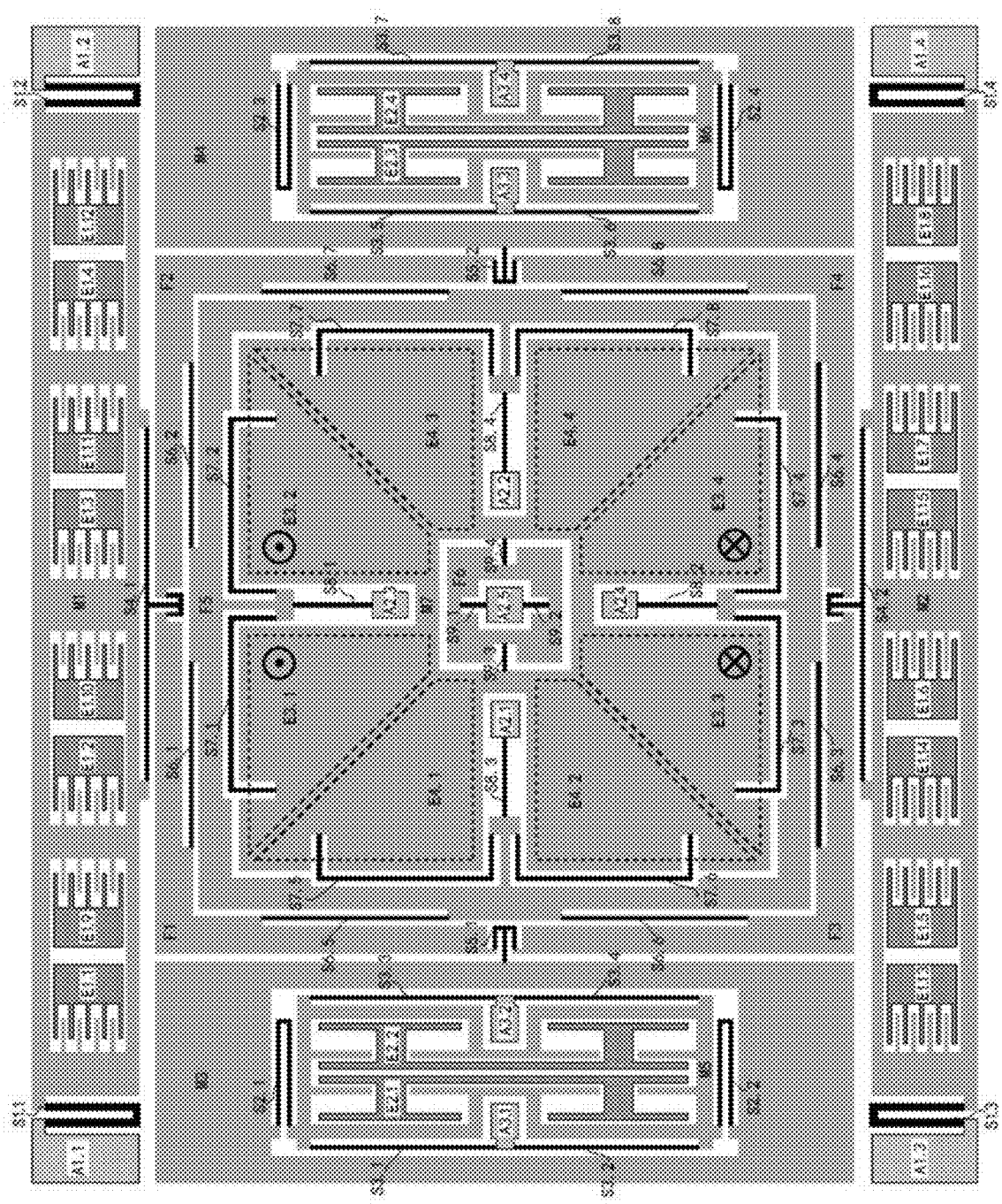
FIG. 4 is a schematic diagram illustrating Y-axis detection of the three-axis MEMS gyroscope in FIG. 1.

FIG. 4 shows a schematic diagram illustrating Y-axis detection of the three-axis MEMS gyroscope in this embodiment. When an angular velocity is input around the Y axis is input, the X-axis/Y-axis detection proof mass M7 clockwise or counterclockwise rotating around the structural center is subjected to a Coriolis force around the Y axis. In this case, the X-axis/Y-axis detection proof mass M7 is forced to rotationally reciprocate around an X-direction axis, namely a horizontal line defined by the spring beam S8.3, the spring beam S8.4, the spring beam S9.3, and the spring beam S9.4, and outside the plane defined by the X axis and the Y axis; and under the circumstance, the distance from the X-axis/Y-axis detection proof mass M7 to the fixed electrode E3.1 and the fixed electrode E3.2 and the distance from the X-axis/Y-axis detection proof mass M7 to the fixed electrode E3.3 and the fixed electrode E3.4 are changed oppositely, so that the capacitor C_Y1 and the capacitor C_Y2 are changed in a manner that one is increased and the other is decreased. The angular velocity input around the Y axis can be calculated by means of the subsequent difference channel.

Figure 5:
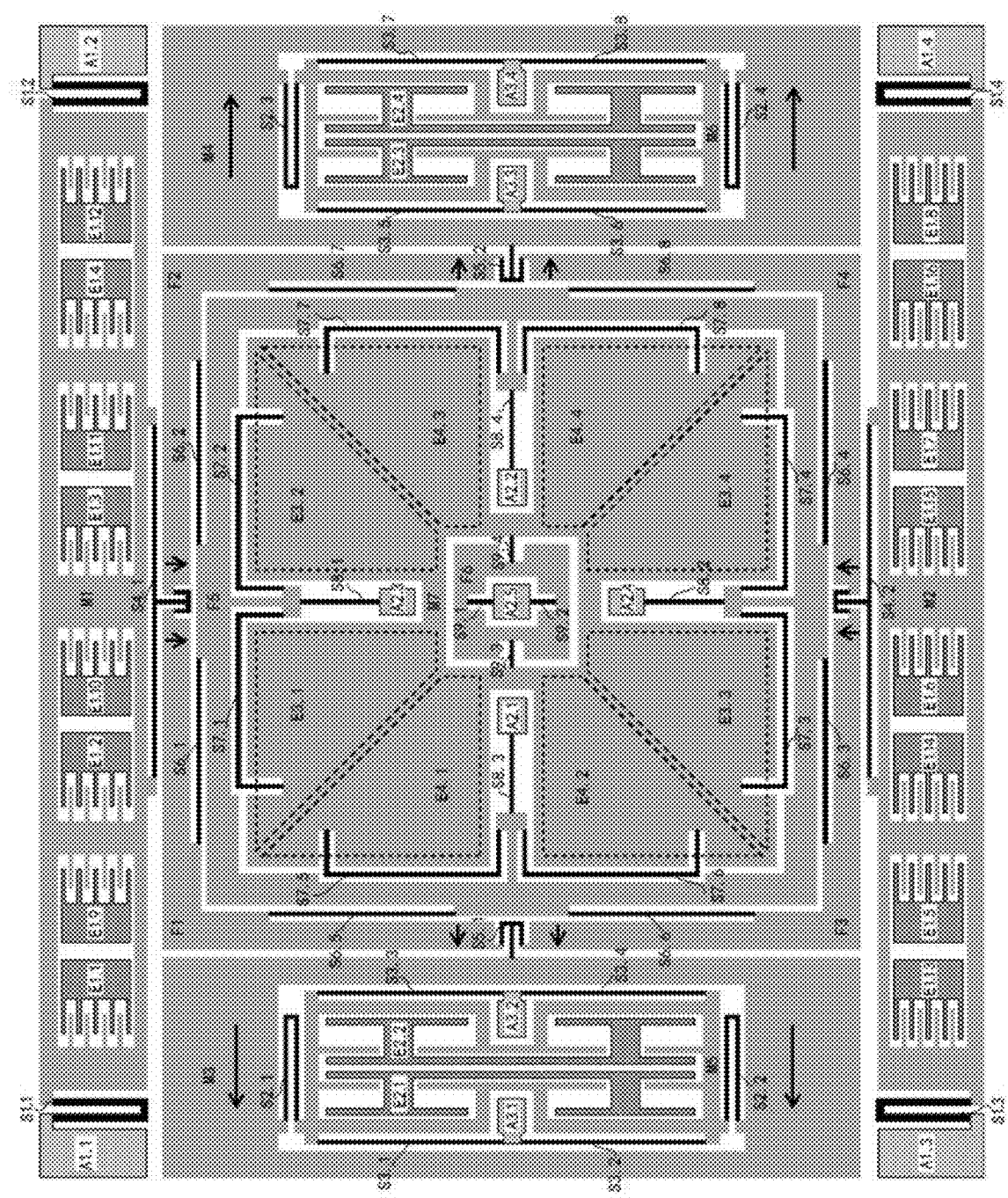
FIG. 5 is a schematic diagram illustrating Z-axis detection of the three-axis MEMS gyroscope in FIG. 1.

FIG. 5 shows a schematic diagram illustrating Z-axis detection of the three-axis MEMS gyroscope in this embodiment. When an angular velocity is input around the Z axis, the Z-axis Coriolis force proof mass M3 and the Z-axis Coriolis force proof mass M4 which reciprocate in the Y-axis direction are subjected to a Coriolis force around the X axis. In this case, the Z-axis Coriolis force proof mass M3 and the Z-axis Coriolis force proof mass M4 are forced to reciprocate in the X-axis direction; and at the same time, the Z-axis detection proof mass M5 is driven by the Z-axis Coriolis force proof mass M3 through the spring beam S2.1 and the spring beam S2.2 to reciprocate in the X-axis direction, and the Z-axis detection proof mass M6 is driven by the Z-axis Coriolis force proof mass M4 through the spring beam S2.3 and the spring beam S2.4 to reciprocate in the X-axis direction. With movement directions (indicated by arrows) of the Z-axis Coriolis force proof mass M3 and the Z-axis Coriolis force proof mass M4 in FIG. 5 as an example, when the Z-axis detection proof mass M5 and the Z-axis detection proof mass M6 move towards two opposite sides, the distance from the Z-axis detection proof mass M5 to the fixed electrode E2.1 and the distance from the Z-axis detection proof mass M6 to the fixed electrode E2.4 are increased, such that the Z-axis detection capacitor C_Z1 is decreased; and the distance from the Z-axis detection proof mass M5 to the fixed electrode E2.2 and the distance from the Z-axis detection proof mass M6 to the fixed electrode E2.3 are decreased, such that the Z-axis detection capacitor C_Z2 is increased, and vice versa. The angular velocity input around the Z axis can be calculated by means of the subsequent difference channel.

The implementation and effects of this embodiment are further explained below.

1. Fulfillment of Decoupling of the Z-Axis Detection Part from the Driving Part

To achieve stability and consistency of a structure and an output, in the driving mode or the detection mode, any movement state of other structural parts is not expected to be affected. Therefore, it is necessary to fulfill the decoupling of the driving parts and the detection parts during movement.

In the driving mode, as the rigid beam F1 and the rigid beam F3 are connected to the Z-axis Coriolis force proof mass M3 through the spring beam S5.1, and the rigid beam F2 and the rigid beam F4 are connected to the Z-axis Coriolis force proof mass M4 through the spring beam S5.2, the Z-axis Coriolis force proof mass M3 and the Z-axis Coriolis force proof mass M4 are driven to move when the rigid beams F1-F4 clockwise or counterclockwise rotate around the fixed anchor A2.5. The Z-axis Coriolis force proof mass M3 is connected to the Z-axis detection proof mass M5 through the spring beam S2.1 and the spring beam S2.2, and the Z-axis Coriolis force proof mass M4 is connected to the Z-axis detection proof mass M6 through the spring beam S2.3 and the spring beam S2.4. The Z-axis detection proof mass M5 is connected to the fixed anchors A2.1-A2.4 through the spring beams S3.1-S3.4, and the Z-axis detection proof mass M6 is connected to the fixed anchors A2.1-A2.4 through the spring beams S3.5-S3.8. With the Z-axis detection proof mass M5 as an example, the fixed anchor A3.1 and the fixed anchor A3.2 are located on two sides of the Z-axis detection proof mass M5; the spring beam S3.1 and the spring beam S3.2 are located on two sides of the fixed anchor A3.1 and connected to the Z-axis detection proof mass M5, and the spring beam S3.3 and the spring beam S3.4 are located on two sides of the fixed anchor A3.2 and connected to the Z-axis detection proof mass M5; and the straight spring beams S3.1-S3.4 have no elasticity in the Y-axis direction, such that the Z-axis detection proof mass M5 is restricted from horizontally moving in the Y-axis direction and rotating within the plane defined by the X axis and the Y axis.

Similarly, the Z-axis detection proof mass M6 can move only in the X-axis direction, and is restricted from horizontally moving in the Y-axis direction and rotating within the plane defined by the X axis and the Y axis.

According to the above description, by means of the Z-axis Coriolis force proof mass M3, the Z-axis Coriolis force proof mass M4, the spring beams S2.1-S2.4, and the spring beams S3.1-S3.8, the decoupling of the Z-axis detection proof masses from the driving part is fulfilled; that is, the Z-axis detection proof masses do not move in the driving mode.

2. Fulfillment of Decoupling of the Driving Part from the Z-Axis Detection Part

In a Z-axis detection mode, the Z-axis Coriolis force proof mass M3 and the Z-axis Coriolis force proof mass M4 are subjected to the Coriolis force in the X-axis direction. In this case, the Z-axis Coriolis force proof mass M3 and the Z-axis Coriolis force proof mass M4 are forced to reciprocate in the X-axis direction; and at the same time, the Z-axis detection proof mass M5 is driven by the Z-axis Coriolis force proof mass M3 through the spring beam S2.1 and the spring beam S2.2 to reciprocate in the X-axis direction, and the Z-axis detection proof mass M6 is driven by the Z-axis Coriolis force proof mass M4 through the spring beam S2.3 and the spring beam S2.4 to reciprocate in the X-axis direction. The Z-axis Coriolis force proof mass M3 is connected to the coupled rigid beams F1-F4 through the spring beam S5.1, and the Z-axis Coriolis force proof mass M4 is connected to the coupled rigid beams F1-F4 through the spring beam S5.2. As shown in FIG. 5, when the Z-axis Coriolis force proof mass M3 and the Z-axis Coriolis force proof mass M4 move leftwards and rightwards respectively in the X-axis direction, the spring beam S5.1 and the spring beam S5.2 are driven to move leftwards and rightwards respectively; and at the same time, as the spring beam S5.1 and the spring beam S5.2 are connected to the rigid beams F1-F4, connected sections are also driven to move leftwards and rightwards respectively. With the rigid beam F1 as an example, the L-shaped rigid beam F1 has an inflection point connected to the rigid beam F5 through the spring beam S6.1 and the spring beam S6.5. The rigid beam F5 is connected to the fixed anchor A2.3, the fixed anchor A2.4, the fixed anchor A2.1, and the fixed anchor A2.2 sequentially through the spring beam S8.1, the spring beam S8.2, the spring beam S8.3, and the spring beam S8.4, and thus is restricted from horizontally moving in the X-axis direction and the Y-axis direction. Accordingly, the rigid beam F1 connected to the rigid beam F5 through the spring beam S6.1 and the spring beam S6.5 is also restricted from horizontally moving in the X-axis direction and the Y-axis direction. Therefore, the rigid beam F1 rotates around the inflection point instead of horizontally moving in the X-axis direction integrally when leftwards pulled by the spring beam S5.1. Similarly, the rigid beams F2-F4 all rotate around their inflection points in the Z-axis detection mode. With rotation of the rigid beams F1-F4, junctions of the rigid beams F1-F4 and the spring beam S4.1 as well as junctions of the rigid beams F1-F4 and the spring beam S4.2 move downwards or upwards, such that a spring connecting the spring beam S4.1 and the driving proof mass M1 as well as a spring connecting the spring beam S4.2 and the driving proof mass M2 is bent. The driving proof mass M1 is connected to the fixed anchor A1.1 through the spring beam S1.1 and connected to the fixed anchor A1.2 through the spring beam S1.2, and the driving proof mass M2 is connected to the fixed anchor A1.3 through the spring beam S1.3 and connected to the fixed anchor A1.4 through the spring beam S1.4; and in this way, the driving proof mass M1 and the driving proof mass M2 can freely move only in the X-axis direction, and are restricted from moving in the Y-axis direction. From the above, the driving part does not move with the movement in the Z-axis detection mode, so that the decoupling of the driving part from the Z-axis detection part is fulfilled.

3. Fulfillment of Decoupling of the X-Axis/Y-Axis Detection Part from the Z-Axis Detection Part In the Z-axis detection mode, the Z-axis Coriolis force proof mass M3 and the Z-axis Coriolis force proof mass M4 are subjected to the Coriolis force in the X-axis direction. In this case, the Z-axis Coriolis force proof mass M3 and the Z-axis Coriolis force proof mass M4 are forced to reciprocate in the X-axis direction; and at the same time, the Z-axis detection proof mass M5 is driven by the Z-axis Coriolis force proof mass M3 through the spring beam S2.1 and the spring beam S2.2 to reciprocate in the X-axis direction, and the Z-axis detection proof mass M6 is driven by the Z-axis Coriolis force proof mass M4 through the spring beam S2.3 and the spring beam S2.4 to reciprocate in the X-axis direction. The Z-axis Coriolis force proof mass M3 is connected to the coupled rigid beams F1-F4 through the spring beam S5.1, and the Z-axis Coriolis force proof mass M4 is connected to the coupled rigid beams F1-F4 through the spring beam S5.2. As shown in FIG. 5, when the Z-axis Coriolis force proof mass M3 and the Z-axis Coriolis force proof mass M4 move leftwards and rightwards respectively in the X-axis direction, the spring beam S5.1 and the spring beam S5.2 are driven to move leftwards and rightwards respectively; and at the same time, as the spring beam S5.1 and the spring beam S5.2 are connected to the rigid beams F1-F4, connected sections are also driven to move leftwards and rightwards respectively. With the rigid beam F1 as an example, the L-shaped rigid beam F1 has the inflection point connected to the rigid beam F5 through the spring beam S6.1 and the spring beam S6.5. The rigid beam F5 is connected to the fixed anchor A2.3, the fixed anchor A2.4, the fixed anchor A2.1, and the fixed anchor A2.2 sequentially through the spring beam S8.1, the spring beam S8.2, the spring beam S8.3, and the spring beam S8.4, and the spring beam S8.2, and thus is restricted from horizontally moving in the X-axis direction and the Y-axis direction. Accordingly, the rigid beam F5 does not move in the Z-axis detection mode, so that the X-axis/Y-axis detection proof mass M7 connected to the rigid beam F5 does not move with the movement in the Z-axis detection mode. Therefore, the decoupling of the X-axis/Y-axis detection part from the Z-axis detection part is fulfilled.

4. Fulfillment of Decoupling of the Driving Part and the Z-Axis Detection Part from the X-Axis/Y-Axis Detection Part When the angular velocity is input around the X axis or the Y axis, the X-axis/Y-axis detection proof mass M7 is subjected to the Coriolis force around the X axis or the Y axis. In this case, the X-axis/Y-axis detection proof mass M7 rotationally reciprocates around a horizontal line defined by the spring beam S9.1 and the spring beam S9.2, or the spring beam S9.3 and the spring beam S9.4, and outside the plane defined by the X axis and the Y axis. As the spring beams S7.1-S7.8 are in a wide U shape, ends, connected to the X-axis/Y-axis detection proof mass M7, of the spring beams S7.1-S7.8 are deformed when subjected to a force in the Z-axis direction, so that the other ends, connected to the rigid beam F5, of the spring beams S7.1-S7.8 do not move obviously; and the rigid beam F5 is connected to the fixed anchor A2.3, the fixed anchor A2.4, the fixed anchor A2.1, and the fixed anchor A2.2 sequentially through the spring beam S8.1, the spring beam S8.2, the spring beam S8.3, and the spring beam S8.4, and thus is restricted from moving in the Z-axis direction. From the above, the rigid beam F5 does not move in an X-axis detection mode or Y-axis detection mode, and no movement of the rigid beam F5 is transferred out, so that the decoupling of the driving part and the Z-axis detection part from the X-axis/Y-axis detection part is fulfilled.

5. Fulfillment of Coupling of a Symmetrical Structure of the Z-Axis Detection Part To achieve stability of output of the detection part, the detection part of the three-axis MEMS gyroscope is of a differential structure in general, that is, two capacitors exist. When the angular velocity is input, one capacitor is increased, and the other capacitor is decreased. A difference value of the two capacitors is obtained by means of the subsequent difference channel, so that the input angular velocity can be calculated. To make two differential structures move in opposite directions with the same amplitude, a coupling structure for achieving symmetry and movement consistency of the differential structures is needed.

In the Z-axis detection mode, the Z-axis Coriolis force proof mass M3 and the Z-axis Coriolis force proof mass M4 are subjected to the Coriolis force in the X-axis direction. In this case, the Z-axis Coriolis force proof mass M3 and the Z-axis Coriolis force proof mass M4 are forced to reciprocate in the X-axis direction; and at the same time, the Z-axis detection proof mass M5 is driven by the Z-axis Coriolis force proof mass M3 through the spring beam S2.1 and the spring beam S2.2 to reciprocate in the X-axis direction, and the Z-axis detection proof mass M6 is driven by the Z-axis Coriolis force proof mass M4 through the spring beam S2.3 and the spring beam S2.4 to reciprocate in the X-axis direction. The Z-axis Coriolis force proof mass M3 is connected to the coupled rigid beams F1-F4 through the spring beam S5.1, and the Z-axis Coriolis force proof mass M4 is connected to the coupled rigid beams F1-F4 through the spring beam S5.2. As shown in FIG. 5, when the Z-axis Coriolis force proof mass M3 and the Z-axis Coriolis force proof mass M4 move leftwards and rightwards respectively in the X-axis direction, the spring beam S5.1 and the spring beam S5.2 are driven to move leftwards and rightwards respectively; and at the same time, as the spring beam S5.1 and the spring beam S5.2 are connected to the rigid beams F1-F4, connected sections are also driven to move leftwards and rightwards respectively. With the rigid beam F1 as an example, the L-shaped rigid beam F1 has the inflection point connected to the rigid beam F5 through the spring beam S6.1 and the spring beam S6.5. The rigid beam F5 is connected to the fixed anchor A2.3, the fixed anchor A2.4, the fixed anchor A2.1, and the fixed anchor A2.2 sequentially through the spring beam S8.1, the spring beam S8.2, the spring beam S8.3, and the spring beam S8.4, and thus is restricted from horizontally moving in the X-axis direction and the Y-axis direction. Accordingly, the rigid beam F1 connected to the rigid beam F5 through the spring beam S6.1 and the spring beam S6.5 is also restricted from horizontally moving in the X-axis direction and the Y-axis direction. Therefore, the rigid beam F1 rotates around the inflection point instead of horizontally moving in the X-axis direction integrally when leftwards pulled by the spring beam S5.1. Similarly, the rigid beams F2-F4 all rotate around their inflection points in the Z-axis detection mode. In the Z-axis detection mode, the Z-axis Coriolis force proof mass M3 and the Z-axis Coriolis force proof mass M4 move leftwards and rightwards respectively in the X-axis direction. As shown in FIG. 5, when the Z-axis Coriolis force proof mass M3 moves leftwards, the junction of the rigid beam F1 and the spring beam S4.1 moves downwards; the rigid beam F2 moves in the same way with the same amplitude by means of the spring beam S4.1, so that the rigid beam F1 and the rigid beam F2 move in the same direction with the same amplitude. However, the rigid beam F2 is connected to the Z-axis Coriolis force proof mass M4 through the spring beam S5.2, resulting in restriction on a movement state of the rigid beam F2. Therefore, stability of left-right movement of the Z-axis Coriolis force proof mass M3 and the Z-axis Coriolis force proof mass M4 is achieved. When the Z-axis Coriolis force proof mass M3 moves leftwards, as the rigid beam F1 is connected to the rigid beam F3 through the spring beam S5.1, the rigid beam F1 and the rigid beam F3 move in the same direction with the same amplitude by means of the spring beam S5.1. Similarly, the rigid beam F2 is connected to the rigid beam F4 through the spring beam S5.2, so that the rigid beam F2 and the rigid beam F4 move in the same direction with the same amplitude by means of the spring beam S5.2. In this way, the rigid beams F1-F4 move with the same amplitude on the Y-axis direction, so that the Z-axis Coriolis force proof mass M3 and the Z-axis Coriolis force proof mass M4 have no additional movement in the Y-axis direction. From the above, by means of the rigid beams F1-F4, the Z-axis Coriolis force proof masses move only in the X-axis direction in a case where a Z-axis angular velocity is input; and moreover, the Z-axis Coriolis force proof masses move in opposite directions with the same amplitude. Therefore, the Z-axis detection proof mass M5 and the Z-axis detection proof mass M6 are driven to move in a completely same way, so as to achieve a coupling effect.

In addition, in the detection parts of the three-axis MEMS gyroscope in this embodiment, to reduce volume of a chip and area of the proof masses to a greater extent, the rigid beam F6 and the spring beams S9.1-S9.4 are coordinately arranged, so that the proof masses can not only rotate around the X axis, namely a straight line defined by the spring beam S9.3 and the spring beam S9.4, but also rotate around the Y axis, namely the straight line defined by the spring beam S9.1 and the spring beam S9.2. In this way, the X-axis detection proof mass and the Y-axis detection proof mass are combined to form the X-axis/Y-axis detection proof mass M7, so that the area utilization rate of the detection proof masses is effectively improved.

The foregoing is detailed description of the preferred specific embodiments of the present disclosure. It should be understood that a person of ordinary skill in the art can make various modifications and variations according to the concept of the present disclosure without creative efforts. Therefore, all technical solutions that a person skilled in the art can obtain based on the prior art through logical analysis, reasoning, or finite experiments according to the concept of the present disclosure shall fall within the protection scope defined by the appended claims.

What is claimed is:

1. A three-axis microelectromechanical system (MEMS) gyroscope, comprising:
   a first proof mass configured to move in an X-axis direction;
   a second proof mass configured to rotate around an X-direction axis, a Y-direction axis, and a Z-direction axis;
   a third proof mass configured to move in the X-axis direction and a Y-axis direction;
   a fourth proof mass configured to move in the X-axis direction, wherein the third proof mass is connected to the fourth proof mass through a spring beam; and when the third proof mass moves in the X-axis direction, the fourth proof mass is driven to move in the X-axis direction;
   a first rigid beam, wherein the first rigid beam is respectively connected to the first proof mass and the third proof mass through a spring beam; and when the first proof mass moves in the X-axis direction, the first rigid beam is driven to move, and the third proof mass is driven by the first rigid beam to move in the Y-axis direction;
   a second rigid beam, wherein the second rigid beam is respectively connected to the second proof mass and the first rigid beam through a spring beam; and when the first proof mass moves in the X-axis direction, the first rigid beam is driven to rotate around the Z-direction axis, the second rigid beam is driven by the first rigid beam to rotate around the Z-direction axis, and the second proof mass is driven by the second rigid beam to rotate around the Z-direction axis; and
   a third rigid beam, wherein the third rigid beam is respectively connected to the second proof mass and a fixed anchor through a spring beam; and the X-direction axis and the Y-direction axis are defined by the spring beam connected to the third rigid beam, so that the second proof mass is fit to rotate around the X-direction axis and the Y-direction axis.

2. The three-axis MEMS gyroscope according to claim 1, wherein the first rigid beam comprises a plurality of sub-beams, wherein a joint of the first rigid beam and the first proof mass is set to connect two of the plurality of sub-beams to the first proof mass through one spring beam; a joint of the first rigid beam and the third proof mass is set to connect two of the plurality of sub-beams to the third proof mass through one spring beam; and the plurality of sub-beams are sequentially connected end to end.

3. The three-axis MEMS gyroscope according to claim 1, wherein the second rigid beam is further connected to a fixed anchor through a spring beam, and the second rigid beam is restricted from moving in the X-axis direction and the Y-axis direction.

4. The three-axis MEMS gyroscope according to claim 1, wherein the fourth proof mass is further connected to a fixed anchor through a spring beam, and the fourth proof mass is configured to move in the X-axis direction, and restricted from moving in the Y-axis direction.

5. The three-axis MEMS gyroscope according to claim 1, further comprising a first fixed electrode and a second fixed electrode, wherein the first fixed electrode and the second fixed electrode coordinate with the second proof mass to form corresponding detection capacitors, which are respectively configured to perform detection when the second proof mass rotates around the X-direction axis and around the Y-direction axis.

6. The three-axis MEMS gyroscope according to claim 1, further comprising a third fixed electrode, wherein the third fixed electrode coordinates with the fourth proof mass to form a detection capacitor.

* * * * *